Jan. 15, 1963　　　H. E. HOFFMAN　　　3,073,062
WATER ABSORBENT FLOWER HOLDERS AND METHODS OF MAKING SAME
Filed Feb. 19, 1959　　　2 Sheets-Sheet 1

INVENTOR.
HERBERT E. HOFFMAN
BY
ATTORNEYS

Jan. 15, 1963 H. E. HOFFMAN 3,073,062
WATER ABSORBENT FLOWER HOLDERS AND METHODS OF MAKING SAME
Filed Feb. 19, 1959 2 Sheets-Sheet 2

INVENTOR.
HERBERT E. HOFFMAN
BY
ATTORNEYS

United States Patent Office 3,073,062
Patented Jan. 15, 1963

3,073,062
WATER ABSORBENT FLOWER HOLDERS AND METHODS OF MAKING SAME
Herbert E. Hoffman, 11118 Clifton Blvd., Clifton Manor 34, Cleveland 2, Ohio
Filed Feb. 19, 1959, Ser. No. 794,352
10 Claims. (Cl. 47—41)

This invention relates to water absorbent devices into which the stems of flowers or the like may be inserted to support and preserve the same, including means for retaining a substantial quantity of water therein without the necessity for employing any separate water-holding vase or other vessel. The invention also relates to methods of making such devices.

Heretofore, blocks of so-called "plastic foams" have been used in vases, bowls, and the like to absorb water and hold it in a substantially immobile condition, the blocks of foam being self-sustaining, solid, porous masses but being sufficiently soft and fragile to permit the stems of flowers to be inserted therein when the blocks are saturated with water. The water absorbed in the pores of such plastic foams is retained around and in contact with the stems of the flowers so as to preserve them against wilting, and the water is retained in the pores of the foams in a substantially immobile condition so that it cannot be spilled and will evaporate very slowly.

The principal objects to such plastic foams, which are not satisfactory for repeated use, are the relatively high cost of the foams and the fact that their use generally requires that they be placed in a separate vase, bowl, or other vessel to protect table surfaces or the like from being wetted by the water contained in the foams. Also, the foams heretofore available for such uses have absorbed water very slowly. As a result, it is generally necessary to soak these foams in water for a substantial time before they are used as described above.

The principal objects of the present invention are to produce improved highly porous, water absorbent bodies of greater versatility in use and having the ability to absorb a larger amount of water more rapidly and to retain it without the necessity for employing any separate vase or vessels in conjunction therewith. An additional object of the invention is to accomplish the foregoing at a minimum cost for materials and manufacturing operations. Still another object of the invention is to provide improved methods for making the flower holders of the invention.

The flower holders of the invention are characterized by a water absorbent body of set plaster of Paris having a high degree of porosity due to the presence of a network of interconnected, relatively large cells or pores capable of quickly absorbing a volume of water ranging from about 50% to 70% or so of the entire volume of the plaster of Paris mass. The porous plaster of Paris itself is structurally rather weak and fragile, particularly after having absorbed a large quantity of water, being generally comparable to the plastic foams in that regard. Without some kind of reinforcing support, the saturated porous masses must be handled with care in use. Also, because they are wet to the touch from the water absorbed thereby, they cannot conveniently be used alone as a flower holder. To overcome these limitations, in accordance with the invention, the porous bodies are provided with an external reinforcing structure which covers at least the entire bottom surface of the porous mass and which may also cover at least the lower side surfaces thereof. Where the reinforcing structure is impervious to water, it also serves as an aid in retaining water in the porous plaster mass, much in the manner of a separate pan or vessel. Where the external reinforcing layer is not itself sufficiently impervious to water, it may in turn be covered with a suitable water impervious film, and this coating film may also extend over any exposed side surfaces of the porous, water-retaining mass above the upper edge of the reinforcing structure to further aid in the retention of water in the porous mass.

The foregoing objects, features, and advantages of the invention will be more fully understood from the following description of illustrative embodiments of presently preferred forms of the invention, and of methods of making the same, considered in conjunction with the accompanying drawings in which—

Figure 1:
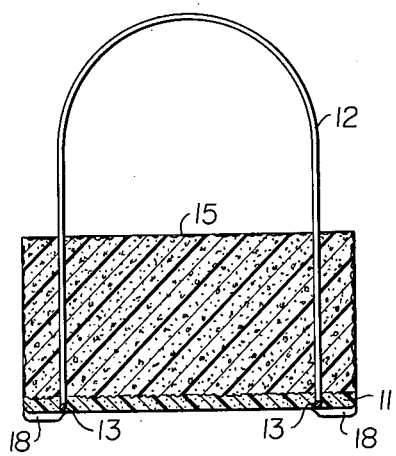
FIGURE 1 is a vertical sectional view through a water absorbent device constructed in accordance with the invention.

Referring to FIGS. 1–4 of the drawings, the device shown therein comprises a block 10 of a highly porous mass of set plaster of Paris having a network of intercommunicating pores capable of absorbing and holding a substantial amount of water. This porous plaster block is preferably made from an aerated slurry consisting essentially of partially calcined gypsum (plaster of Paris) and water in about equal parts, plus a very small quantity of a water-soluble, foam producing, surface active agent or foaming agent. The amount of the foaming agent used depends upon its activity as a foam producer and upon the degree of porosity desired in the product.

Although the present invention is not limited to the precise composition or method of producing the porous plaster of Paris block, it is preferably produced by first mixing the water and foaming agent and beating or whipping the mixture into a froth. Generally, the amount of foaming agent will be in the range of about 0.1% to 1.0% by weight of the water used in the plaster slurry. Then, while continuing to agitate the froth, the plaster of Paris is gradually added to the froth over a period of one to three minutes according to the size of the batch being handled. Preferably, the froth is agitated so as to create a vortex, or other rapidly moving froth surface of relatively large area, and the plaster of Paris is sifted over the froth surface and is rapidly carried into and uniformly mixed with the mass of froth by virtue of the agitation. When using approximately equal parts of water and plaster of Paris, the slurry will reach a condition of incipient setting in from about one-half to two minutes after the addition of the plaster of Paris has been completed, depending upon the speed of the addition. Thereupon, the agitation is quickly stopped and the froth slurry is cast into blocks in suitable molds. The foregoing method of making a highly porous plaster of Paris block, and the product of the method, are the subjects of my copending application Serial No. 738,253, filed May 28, 1958, now Patent No. 2,913,346, dated November 17, 1959.

Secured to the lower surface of the porous block 10 is a reinforcing layer or slab 11 of a structurally relatively strong material which, in this instance, is also a mass of set plaster of Paris, but without the high porosity of the block 10. The slab 11 is bonded to the porous block 10 so as to form a monolithic structure therewith.

As an aid in handling the device, both before and after the pores of the block 10 have been filled with water, a suitable bail 12 is incorporated therein. The bail 12 is preferably a highly flexible, solid or braided wire or the like and, if desired, may be surrounded or coated with a layer of rubber or plastic. Conventional rubber or plastic, insulated, electrical copper wire is suitable for this purpose. The lower ends of the legs of the bail 12 are bent at right angles to provide offset feet 13, which are preferably embedded in the reinforcing slab 11 so as to be securely held thereby.

The assembly of the block 10, slab 11, and bail 12 is preferably made by first preparing an ordinary non-aerated slurry of plaster of Paris and plain water (no frothing agent being added) having a degree of fluidity enabling it to be readily poured into a mold. This slurry is poured, to the depth of the slab 11 shown in the drawing, into a mold deep enough to form both the slab 11 and block 10. Thereupon, the aerated slurry described above is poured into the same mold on top of the non-aerated slurry. Before either of the slurries has hardened, the legs of the bail 12 are merely pushed downwardly in the mold through the frothed slurry and into the unfrothed slurry to embed the feet 13 of the bail 12 in the slab 11 of the unfrothed slurry, with the feet of the bail resting on the bottom of the mold and aiding in holding the bail in an upright position during setting of the plaster of Paris around it.

When the plaster of Paris is fully set, which requires only about 20 to 25 minutes after it has reached the point of incipient setting referred to above, the cast structure may be lifted out of the mold by means of the bail 12. It may then be dipped into a suitable liquid, waterproofing, coating bath of latex, vinyl plastisol, or the like to form a thin waterproof coating film 14 over the entire outer surfaces of the slab 11 and block 10, except for the top surface 15 of the latter. A thin or highly fluid, fast drying, liquid coating composition is preferred for this purpose. Depending upon its precise character, a second dipping of the device into the liquid coating composition may be desired to form a completely continuous, water-impervious, coating film over the entire bottom and sides of the device, inasmuch as the liquid coating material will be absorbed to some extent into the pores of the plaster block 10 and, to a lesser degree, into the finer pores of the more dense plaster slab 11. The first dipping of the device will generally seal the pores on the side and bottom surfaces of the device, and a second dipping will generally suffice to form the film 14 as a continuous water-impervious coating. Alternatively, the coating film 14 may obviously be applied in any other desired manner, as by spraying the coating composition onto the device.

When the highly porous plaster block 10 is made from a slurry that has been frothed or foamed to incorporate a sufficient volume of air, preferably in the manner described above, it will be capable of holding a volume of water approximating or exceeding 50% of the volume of the mass of the block 10, and may readily be made to absorb a volume of water as high as about 70% of the volume of the block. Unlike the plastic foams heretofore used in the art and referred to above, porous plaster blocks of the character described rapidly absorb their total capacity of water. This absorption is so rapid that the water need merely be poured onto the exposed, uncoated, upper surface 15 of the block 10. The water will be absorbed before it runs over and off of this surface and down the sides of the block. By reason of the water-impervious coating over the side surfaces and bottom surface of the device, these surfaces will remain dry so that the device containing the water may be set on table tops or other surfaces without wetting the same.

When the plaster block 10 has been saturated with water as described, it softens sufficiently so that the fragile stems of flowers of almost any type may readily be pushed downwardly into the wet plaster mass. However, the mass still retains sufficient rigidity and structural strength to firmly support even large, relatively heavy flowers whose stems have been thus inserted into the mass.

Figure 4:
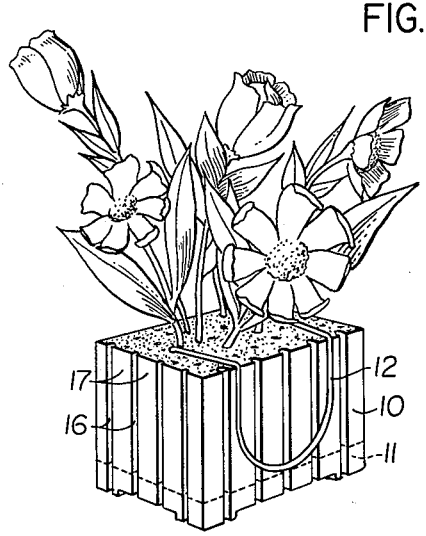
FIG. 4 is a perspective view of the device of FIG. 1, showing how it may be used to hold and preserve flowers.

FIG. 4 shows an arrangement of flowers so mounted with their stems embedded in the block 10. Where such an arrangement of flowers held by the device of the invention is to be placed in a flower basket, vase, bowl, or other decorative container of any kind, it may be desired to bend the bail 12 downwardly and around and along the side of the block 10 as shown, before inserting the stems of the flowers into the block. Otherwise, the flowers may merely be grouped around the bail 12 so as to substantially hide the same.

When it is desired to use the device of FIGS. 1-4 without placing it in any additional decorative basket or container, as shown in FIG. 4, it may be desirable to cut off the bail 12 flush with the top surface 15 of the block with wire cutters before or after arranging the flowers in the device. The device may be given an attractive appearance by employing any suitable colored pigment in the liquid coating composition to give a decorative color to the water-impervious film 14 on the sides and bottom of the device. This appearance may be enhanced by surface ornamentation, such as the vertical grooves 16 and intervening ribs 17, molded in relief on the sides of the device. Also, suitable bosses 18 may be molded on the slab 11 to serve as feet for the device.

While the coating film 14 has been shown and described as covering the sides of the device from the bottom up to the top thereof, it is not essential that the coating extend upwardly to that extent. However, it is preferred that this coating film extend at least half way up the block 10 from the bottom thereof so as to minimize evaporation of water from the block as well as to prevent wetting of a surface upon which the device may rest in use.

Because the water absorbed in a device of the character described above is largely contained within the pores of the plaster block 10, it evaporates very slowly and is consumed substantially only by its absorption into the stems of the flowers inserted therein. Since from about 50 to about 70% of the total volume of the block 10 may consist of water absorbed therein, it is apparent that the device will be capable of holding and preserving cut flowers for long periods of time before the water supply for the flowers is consumed. By reason of the reinforcing effect of the slab 11 secured in supporting relationship with the block 10, the device may be given ample structural strength to be safely handled and moved about even after it has been saturated with water and an arrangement of flowers has been mounted therein. Such handling may obviously be facilitated by the bail 12. If the devices are to be made of large size, of the order of 10 or 12 inches or more in any horizontal dimension, the strength of the base 11 may desirably be increased by incorporating additional reinforcing material into the slab 11 itself. This may be done, for example, by mixing any desired kind of reinforcing fibers (not shown) with the unfrothed plaster of Paris slurry of which the slab 11 is formed; or a sheet of cheesecloth or wire fabric, or similar reinforcing material (not shown) may be placed in the bottom of the mold in which the slab 11 is cast, so as to be embedded within the slab 11 itself.

The composition of the porous plaster block 10 lends itself to another advantage over the prior art plastic foams referred to above in that various organic and inorganic plant foods and/or preservatives may be mixed with the plaster of Paris of which the block 10 is formed before making an aerated or frothed slurry of the plaster of Paris. Such foreign materials may be used in admixture with plaster of Paris in appreciable amounts without deleteriously affecting its properties, whereas the materials of which plastic foams are formed are less tolerant of such additions of foreign materials.

Figure 5:
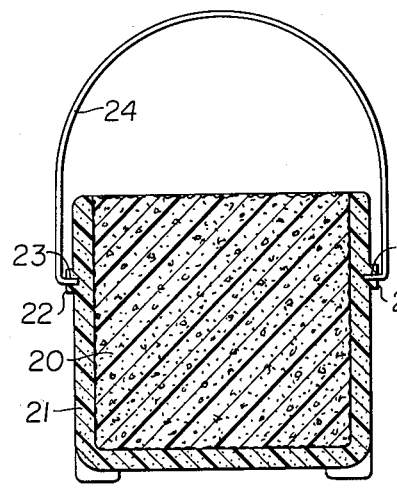
FIG. 5 is a vertical sectional view of a modification of the device of FIG. 1.
Figure 3:
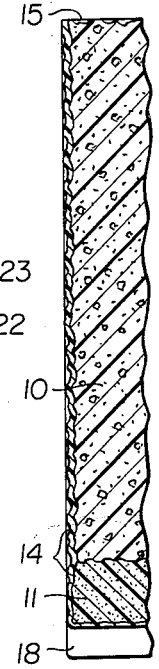
FIG. 3 is a fragmentary vertical sectional view of the device of FIG. 1, shown on an enlarged scale to illustrate certain details thereof.
Figure 2:
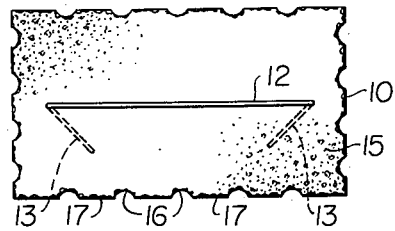
FIG. 2 is a plan view of the device of FIG. 1.

Referring now to the modification of the invention shown in FIG. 5, a highly porous block 20 of set plaster of Paris, similar to the block 10 of FIGS. 1–4, may be cast in a preformed container 21, such as a jar, vase, bowl, or the like, suitably made of plaster of Paris or any other desired plaster, clay, or ceramic material having substantial structural strength. As shown, the reinforcing container 21 may have apertured lugs 22 formed on the sides thereof for receiving inwardly bent ends 23 of a relatively stiff wire bail 24. The bail 24 may be left in place or removed if desired by simply springing the legs of the bail outwardly. Depending upon the porosity of the material of which the container 21 is made, it may or may not be desirable to apply a water impervious coating film over the exterior surfaces thereof, before or after casting the highly porous block 20 therein. Except in the respects mentioned above, the device of FIG. 5 is essentially the same as the device of FIGS. 1–4 and is subject to the obviously applicable modifications mentioned in the description of the device of FIGS. 1–4.

Figure 6:
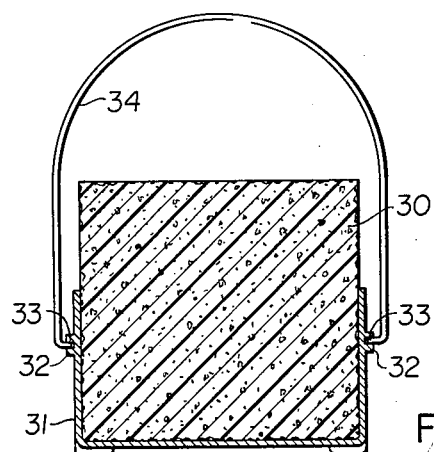
FIG. 6 is a vertical sectional view of another modification of the device of FIG. 1.

Referring now to the device of FIG. 6, a highly porous plaster block 30, similar to the block 10 of FIGS. 1–4, may be separately precast and merely slipped into a closely fitting preformed container 31 of metal, plastic, or other suitable water-impervious structural material. Alternatively, by preplacing the container 31 in a suitable mold, the highly porous block 30 may be cast directly therein, if desired. As shown, the container 31 may be provided with integrally formed apertured bosses 32 receiving inturned ends 33 of a relatively rigid wire bail 34. In the embodiment of the invention illustrated in FIG. 6, it is less important to apply a water-impervious coating film to the sides and bottom of the porous block 30, and such a coating film may be omitted, depending upon whether the side walls of the container 31 enclose the porous block 30 over the major portion of the height thereof. As in the embodiment of the invention shown in FIG. 5, the wire bail 34 may be removed if desired simply by springing the legs of the bail outwardly.

Figure 7:
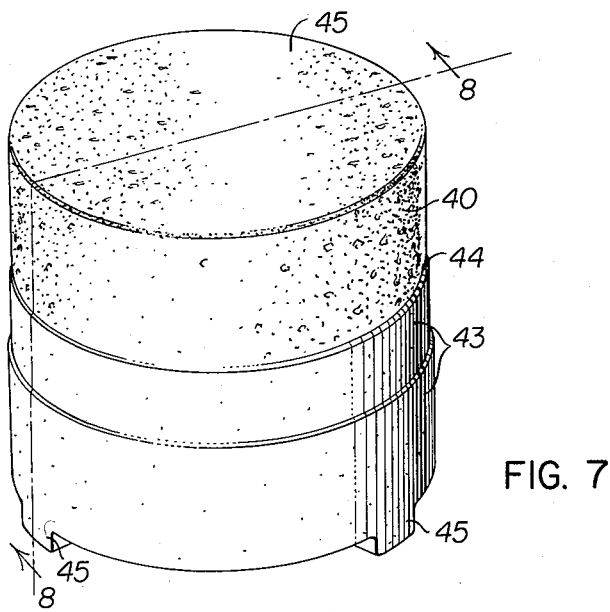
FIG. 7 is a perspective view of still another modification of the device of FIG. 1.
Figure 8:
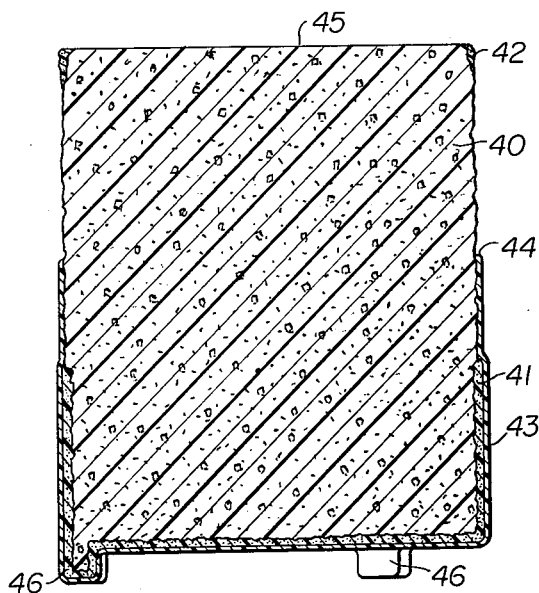
FIG. 8 is a vertical sectional view of the device of FIG. 7.

Referring now to the embodiment of the invention shown in FIGS. 7 and 8, a highly porous set plaster of Paris block 40 of any desired shape may be cast in a mold from a frothed or aerated plaster of Paris slurry of the type described above. Upon removal of this relatively fragile, highly porous body from the mold after the aerated slurry has set, a reinforcing layer 41 of a relatively strong, unfrothed plaster of Paris slurry may be formed and set over the bottom and over part or all of the side walls thereof by simply dipping the block 40 into a mixture of plaster of Paris in sufficient plain water to form a fluid slurry.

The thickness of the reinforcing layer 41 formed in this manner will vary according to the length of time of immersion of the block 40 in the slurry and upon the consistency of the slurry itself. With a slurry only sufficiently thin to pour freely, a coating about 1/32 inch in thickness may be formed merely by dipping the block 40 into the slurry and withdrawing it practically instantaneously. By leaving the block 40 immersed in the slurry for a period of about one minute, a layer 41 about 1/8 inch in thickness may be formed. Although plaster of Paris made from a slurry containing sufficient water to be highly fluid generally produces a rather weak structure when fully set, due to the high initial water content of the slurry, the highly porous block 40, when dipped into such a slurry, rapidly absorbs water from the wet plaster of Paris coating formed thereon, thus reducing the water-to-plaster of Paris ratio in the wet coating before the plaster of Paris begins to set. As a result, a relatively strong reinforcing layer 41 may be formed in this manner.

In addition to the reinforcing layer 41 formed about the bottom and lower side portions of the block 40 a narrow reinforcing rim 42 may be similarly formed by dipping only the upper rim or edge of the block into the same kind of unfrothed plaster of Paris slurry. Such a reinforcing rim 42 helps to prevent breaking or crumbling of the block in this region while it is being handled, without impairing the penetrability of the block by the stems of flowers of any substantial area after the block has been saturated with water. Thus, the stems of flowers may readily be inserted into the saturated block at points of substantially the entire upper surface and over most of the side surfaces thereof down to the level of the lower reinforcing layer 41. After forming the reinforcing layers 41 and 42, the entire area of the sides of the block may be sprayed or otherwise coated, if desired, with a thin, pigmented paint or lacquer film (not shown) as a decorative finish coat to give it any desired color without materially affecting the permeability of the decorated surface by the stems of flowers after the block has been saturated with water.

After the reinforcing layers 41 and 42 have been applied to the block 40 by one or more dips in an unfrothed plaster of Paris slurry, an outer, water-impervious, coating film 43, of the same character as the coating film 14 on the device of FIGS. 1–4, may be applied in the same manner. As shown, this water-impervious coating film 43 may cover the bottom and the sides of the device up to any desired height 44 thereon, preferably close to the upper uncoated surface 45 of the porous block 40. However, the height 44 of the coating film 43 on the sides of the device is in no way critical and is subject to the same variations mentioned in the description of the device of FIG. 1–4.

As indicated above, the device of FIGS. 7 and 8 may be formed in any desired shape to serve a variety of decorative needs and artistic flower arranging schemes. It may be provided with any desired number of integrally formed feet 46, which may be cast as a part of the block 40 and subsequently similarly coated by the coating materials of the reinforcing layer 41 and the exterior coating film 43. The coating film 43 may be pigmented to give it any desired decorative color; and any desired additional surface ornamentation, in relief, may be molded on the sides of the block 40 before the coating layers 41, 42, and 43 are applied thereto. The resulting device is thus adapted to be given an attractive decorative appearance as a flower holder and may be sufficiently reinforced, both by the reinforcing layers 41 and 42 and by the exterior coating film 43, to have considerable structural strength in use, even after the porous block 40 has been saturated with water.

From the foregoing description of several embodiments of the present invention, it will be appreciated that the invention is not limited to the particular details shown and described, but may take many forms within the scope of the invention as defined in the appended claims and may be used in a variety of ways. It will also be appreciated that the inexpensive materials of which the devices of the invention may be constructed and the simplicity of the methods for making them enable them to be produced in quantity at very low cost. As a result, they may be sold at wholesale prices sufficiently low to be highly attractive for extensive use by commercial florists, and also may be sold at attractive retail prices for noncommercial domestic use. The devices are highly efficient in absorbing and retaining large quantities of water or other liquid and retaining it in a substantially immobile condition so as to avoid any likelihood of the water being spilled or seeping or sweating through the walls of the device onto a supporting surface.

What is claimed is:

1. A water absorbent flower holder into which the stems of flowers or the like may be inserted to support and preserve the same, said flower holder comprising a structurally weak, highly porous, mass of set plaster of Paris having intercommunicating pores sufficient to absorb and hold, in a substantially immobile condition, a volume of water approximating at least 50% of the volume of said mass, said mass having an exposed top surface and an opposite bottom surface on which it is adapted to rest, and an external reinforcing layer of a structurally relatively strong material infused into the pores of said mass over said bottom surface and side surfaces to a substantial height from said bottom surface thereof to support the mass and enable it to be handled without crumbling, said reinforcing layer being a set plaster of Paris of relatively low porosity permeating and bonded to said highly porous mass to form a monolithic structure therewith.

2. A water absorbent flower holder into which the stems of flowers or the like may be inserted to support and preserve the same, said flower holder comprising a structurally weak, highly porous, mass of set plaster of Paris having intercommunicating pores sufficient to absorb and hold, in a substantially immobile condition, a volume of water approximating at least 50% of the volume of said mass, said mass having an exposed top surface and an opposite bottom surface on which it is adapted to rest, and an external reinforcing layer of a structurally relatively strong material infused into the pores of said mass over said bottom surface and side surfaces to a substantial height from said bottom surface thereof to support the mass and enable it to be handled without crumbling, said reinforcing layer being a set plaster of Paris of relatively low porosity permeating and bonded to said highly porous mass to form a monolithic structure therewith, and a water-impervious coating film covering the bottom surface and the side surfaces of said monolithic structure for a substantial distance up the sides from the bottom thereof to form a water-retaining, cup-shaped layer thereon.

3. A water absorbent flower holder into which the stems of flowers or the like may be inserted to support and preserve the same, said flower holder comprising a structurally weak, highly porous, mass of set plaster of Paris having intercommunicating pores sufficient to absorb and hold, in a substantially immobile condition, a volume of water approximating at least 50% of the volume of said mass, said mass having an exposed top surface and an opposite bottom surface on which it is adapted to rest, and an external reinforcing layer of a structurally relatively strong material infused into the pores of said mass over said bottom surface and side surfaces to a substantial height from said bottom surface thereof to support the mass and enable it to be handled without crumbling, said reinforcing layer being a set plaster of Paris of relatively low porosity permeating and being bonded to said highly porous mass to form a monolithic structure therewith, and a handle for said body comprising a flexible bail having legs projecting downwardly through said mass and into said reinforcing layer and having offset feet embedded in said reinforcing layer to resist withdrawal of said legs.

4. A water absorbent flower holder into which the stems of flowers or the like may be inserted to support and preserve the same, said flower holder comprising a structurally weak, highly porous, mass of set plaster of Paris having intercommunicating pores sufficient to absorb and hold, in a substantially immobile condition, a volume of water at least approximating 50% of the volume of said mass, said mass having an exposed top surface and an opposite bottom surface on which it is adapted to rest, an external, relatively thin, reinforcing layer of set plaster of Paris of relatively low porosity and high structural strength covering the bottom surface and the side surface of said porous mass upwardly from the bottom for a substantial part of the height thereof, said reinforcing layer being infused into the pores of and bonded to said porous mass to form a monolithic structure therewith, and a water-impervious coating film bonded to and covering the bottom surface and the side surfaces of said monolithic structure at least half way up the sides from the bottom thereof so as to substantially completely cover said reinforcing layer, whereby said reinforcing layer and water-impervious coating film combine to support and maintain the physical integrity of said porous mass during handling thereof and to form a water-impervious vessel enclosing at least the lower portion of said porous mass to aid in retaining water absorbed therein.

5. The method of making water absorbent flower holders comprising casting a block of a highly aerated slurry of plaster of Paris and water; allowing the slurry to set to a substantially fully hardened condition; dipping the bottom and sides of the hardened block into a second slurry of plaster of Paris and water having a relatively low content of entrained air to impregnate an outer portion of the block with said second slurry thereon, whereby the hardened block absorbs water from said second slurry during setting thereof; allowing said second slurry to set to a substantially fully hardened condition to form a monolithic reinforcing shell about at least a lower portion of said body; and applying to said shell a coating of a liquid material that it settable to form a water-impervious film, and allowing said coating to set.

6. A water absorbent flower holder adapted to retain a substantial quantity of water in contact with the stems of removably supported flowers said holder comprising a plaster of Paris body having top, bottom and side surfaces, said top surface and substantially all of the interior of said plaster of Paris body having a highly porous, expanded cellular structure formed by intercommunicating pores, said pores being capable of absorbing and holding, in substantially immobile condition, a volume of water approximating at least fifty percent of the volume of said body, and said bottom and sides of said plaster of Paris body, up to a substantial height above said bottom surface, being infused and reinforced with a relatively dense, solid material to provide a reinforcing shell about a lower portion of said body as a monolithic part thereof.

7. A water-absorbent flower holder adapted to retain a substantial quantity of water in contact with the stems of removably supported flowers comprising a body having bottom and side surfaces, said body consisting essentially of a mass of set plaster of Paris having an expanded cellular structure formed by open, intercommunicating pores, said pores being capable of absorbing and holding, in substantially immobile condition, a volume of water approximating at least fifty percent of the volume of said mass, said open pores being closed to a gradually decreasing degree by an infused material from the exterior of said body toward the interior thereof over said bottom surface and a lower peripheral portion of said side surface so as to form a relatively dense and non-porous shell of substantially greater strength than the interior of said body as a monolithic part thereof.

8. A method of making a monolithic, water-absorbent flower holder comprising the steps of casting a relatively thick mass of a highly aerated slurry of plaster of Paris and water into a mold; allowing the slurry to set to form a hardened mass of fragile, highly porous, set plaster of Paris having open, intercommunicating pores; and thereafter infusing a relatively dense material into the open pores of at least one surface of said mass to form a dense, relatively non-porous shell of greater strength than the interior of said plaster of Paris mass as a monolithic part thereof.

9. A method of making a monolithic, water-absorbent flower holder comprising the steps of forming a highly aerated slurry of plaster of Paris and water; casting the highly aerated slurry into a mold; allowing the highly aerated slurry to set to form a hardened mass of fragile, highly porous, set plaster of Paris having open, intercommunicating pores; forming a non-aerated slurry of plaster of Paris and water; dipping at least one end of said hardened porous mass into said non-aerated slurry to form a wet plaster of Paris coating thereon; permitting said porous mass to absorb water from the wet plaster of Paris coating to form a dense, relatively non-porous shell of greater strength than the interior of said mass as a monolithic part thereof.

10. The method as claimed in claim 9 including the step of forming a water-impervious coating over at least a portion of said shell.

References Cited in the file of this patent
UNITED STATES PATENTS

| | | |
|---|---|---|
| 1,295,581 | Palmer | Feb. 25, 1919 |
| 1,709,035 | Payne | Apr. 16, 1929 |
| 2,030,998 | Mann | Feb. 18, 1936 |
| 2,238,132 | Ritter | Apr. 15, 1941 |
| 2,737,746 | Orr | Mar. 13, 1956 |
| 2,745,218 | Cruce | May 15, 1956 |
| 2,913,346 | Hoffman | Nov. 17, 1959 |